(12) United States Patent
Saberan et al.

(10) Patent No.: US 7,090,293 B2
(45) Date of Patent: Aug. 15, 2006

(54) AUTOMOTIVE SEAT ASSEMBLY WITH IMPROVED SIDE IMPACT RIGIDITY

(75) Inventors: Mohammad Saberan, New Baltimore, MI (US); Daniel Armagost, Orion, MI (US); Gerald S. Locke, Lake Orion, MI (US)

(73) Assignee: Lear Corporation, Southfield, MI (US)

( * ) Notice: Subject to any disclaimer, the term of this patent is extended or adjusted under 35 U.S.C. 154(b) by 239 days.

(21) Appl. No.: 10/709,745

(22) Filed: May 26, 2004

(65) Prior Publication Data

US 2005/0264053 A1    Dec. 1, 2005

(51) Int. Cl.
*B60N 2/42* (2006.01)

(52) U.S. Cl. ................................... 297/216.13
(58) Field of Classification Search ........... 297/216.13, 297/216.1, 452.18, 344.15, 452.2
See application file for complete search history.

(56) References Cited

U.S. PATENT DOCUMENTS

| 4,109,959 | A |   | 8/1978  | Barecki |
| 4,192,545 | A |   | 3/1980  | Higuchi |
| 5,447,360 | A |   | 9/1995  | Hewko |
| 5,716,094 | A |   | 2/1998  | Bhalsod |
| 5,826,946 | A |   | 10/1998 | Matthews |
| 5,918,943 | A | * | 7/1999  | Mitschelen et al. ..... 297/452.18 |
| 6,027,167 | A |   | 2/2000  | Blomdell |
| 6,074,004 | A |   | 6/2000  | Carmichael |
| 6,554,356 | B1 |   | 4/2003  | Crose |
| 6,857,698 | B1 | * | 2/2005  | Saberan et al. ........ 297/216.13 |
| 2005/0242634 | A1 | * | 11/2005 | Serber ..................... 297/216.1 |

* cited by examiner

*Primary Examiner*—Peter M. Cuomo
*Assistant Examiner*—Tania Abraham
(74) *Attorney, Agent, or Firm*—Earl J. LaFontaine

(57) ABSTRACT

An automotive seat assembly with improved side impact rigidity is provided including a seat frame. The seat frame includes a frame track, a frame base slidably engaged to the frame track, and a frame back rotatably engaged to the frame base. A rear lateral support assembly includes a support frame attached to a rear portion of the frame base such that the support frame is movable in concert with the frame base. The support frame defines a pocket portion. A tubular member is positioned within the pocket portion. A rocker panel end cap assembly secures a first end of the tubular member within the pocket portion. The rocker panel end cap positioned to engage a rocker panel during side impact. A tunnel console end cap assembly secures a second end of the tubular member within the pocket portion. The tunnel console end cap assembly is positioned to engage a tunnel console such that the tubular member generates a rigid support between the rocker panel and the tunnel console.

19 Claims, 3 Drawing Sheets

AUTOMOTIVE SEAT ASSEMBLY WITH IMPROVED SIDE IMPACT RIGIDITY

BACKGROUND OF INVENTION

The present invention relates generally to an automotive seat assembly and more particularly to seat assembly for contributing to increase side-impact rigidity.

Automotive side-impact protection is a significant field in automotive design. Automobile side impact protection often includes mandated parameters in accordance with federal requirements. The National Highway Traffic Safety Administration additionally has begun performing a higher velocity Lateral Impact New Car Assessment Program (LINCAP) test, using a moving deformable barrier (MDB) to arrive at a performance rating for each vehicle. The importance of positive performance on such testing, in addition to customer safety and satisfaction, places automotive side impact protection as an important design consideration.

It is apparent that during many simulations, the MDB generates interaction with the rocker panel of the struck vehicle. Common MDBs create a simulated vehicle to strike the test impact vehicle. Newer MDBs used to simulate SUVs and pickup trucks (such as the Insurance Institute for Highway Safety testing (IIHS)) have been found to generate further interaction with the rocker panel of the struck vehicle. In fact, the higher ground clearance and mass of these new MDBs, when striking a test passenger vehicle, has been found to override the rocker panel and generate additional side impact intrusion. This is clearly undesirable.

The lateral strength of vehicle seats positioned within the struck vehicle play a role in side-impact test ratings. Vehicle crash comparisons demonstrate that a seat that is stronger in lateral compression may improve the LINCAP and other side-impact test ratings. Lateral seat strength may play an even more important role in the IIHS testing as the IIHS MDB typically contacts the struck vehicle in an even higher location that the federal requirements test.

It would, therefore, be highly desirable to have an automotive design with improved side impact rigidity to resist intrusion during side impact. It would further be highly desirable to have an automotive seat assembly that contributed toward prevention of rocker override and side-impact intrusions.

SUMMARY OF INVENTION

It is, therefore, an object of the present invention to provide an automotive seat assembly with improved side-impact rigidity. It is a further object of the present invention to provide an automotive seat assembly with improved resistance to rocker override and side impact intrusions.

In accordance with the objects of the present invention, an automotive seat assembly with improved side impact rigidity is provided. The seat assembly includes a seat frame. The seat frame includes a frame track, a frame base slidably engaged to the frame track, and a frame back rotatably engaged to the frame base. A rear lateral support assembly includes a support frame attached to a rear portion of the frame base such that the support frame is movable in concert with the frame base. The support frame defines a pocket portion. A tubular member is positioned within the pocket portion. A rocker panel end cap assembly secures a first end of the tubular member within the pocket portion. The rocker panel end cap positioned to engage a rocker panel during side impact. A tunnel console end cap assembly secures a second end of the tubular member within the pocket portion. The tunnel console end cap assembly is positioned to engage a tunnel console such that the tubular member generates a rigid support between the rocker panel and the tunnel console.

Other objects and features of the present invention will become apparent when viewed in light of the detailed description of the preferred embodiment when taken in conjunction with the attached drawings and appended claims.

DETAILED DESCRIPTION

Figure 5:
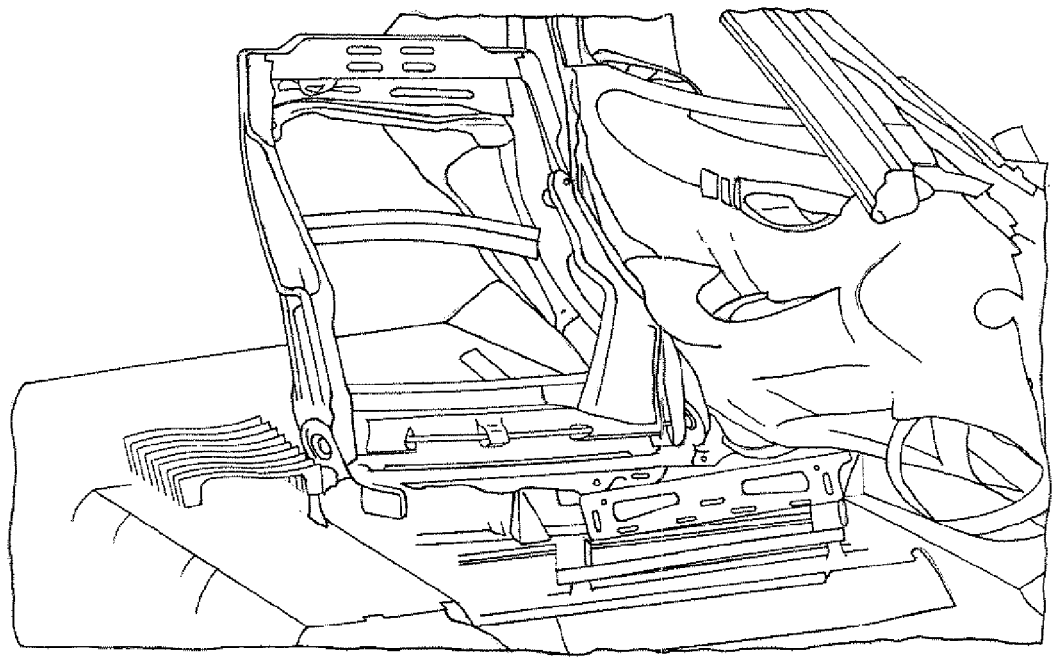
FIG. 5 is an illustration of the automotive seat assembly illustrated in FIG. 1, the seat illustrated mounted within an automobile post side-impact.

The present invention provides an improved automotive seat assembly 10 for improved resistance to side-impact collisions. The seat assembly 10 preferably includes a seat frame assembly 12 mounted to the floor pan 14 of an automobile 16 (see FIG. 5). The seat frame assembly 12 is comprised of a frame track 18 for mounting directly to the floor pan 14 or similar automotive structure, a frame base 20 slidably engaged to the frame track 18 for providing a range of seating positions, and a frame back 22 rotatably engaged to the frame base 20. Such is the basis construction of the seat frame assembly 12.

The present invention, however, goes on to provide an improved rigidity to side impact by including a rear lateral support assembly 24 mountable to a rear portion 25 of the frame base 20. Although the rear lateral support assembly 24 may be affixed in a variety of fashions, it is preferably bolted to the frame base 20 to allow retrofit and ease of assembly. By attachment to the frame base 20, the rear lateral support assembly 24 can move in concert with the frame base 20 and therefore does not interfere with the variety of seating positions normally achieved through the use of a frame base.

The rear lateral support assembly 24 is comprised of a support frame 26 extending the width of the frame base 20. The support frame 26 directly mounts to the frame base 20 such that it moves in concert in a fore/aft fashion with the frame base 20. The support frame 26 defines a pocket portion 28 that may includes a forward extended pocket portion 30. A tubular member 32 spans the length of the support frame 26 and is positioned within the pocket portion 26. When a forward extended pocket portion 30 is utilized, a foreword extended tubular portion 34 is preferably utilized on the tubular member 32. A rocker panel end cap assembly 36 secures the first end 38 of the tubular member 32 to the support frame 26. The rocker panel end cap assembly 36 preferably includes a rocker panel end cap 40 and a c-section triangular brace 42. The rocker panel end cap 40 is preferably an elongated end cap to increase the rocker panel impact area 44. The second end 46 of the tubular member 32 is secured to the support frame 26 through the use of a tunnel console end cap assembly 48. This preferably includes a tunnel end cap 50 and a tunnel hook brace 52. The tunnel end cap 50 preferably generates an elongated end cap to increase the tunnel console impact area 54.

Figure 4:
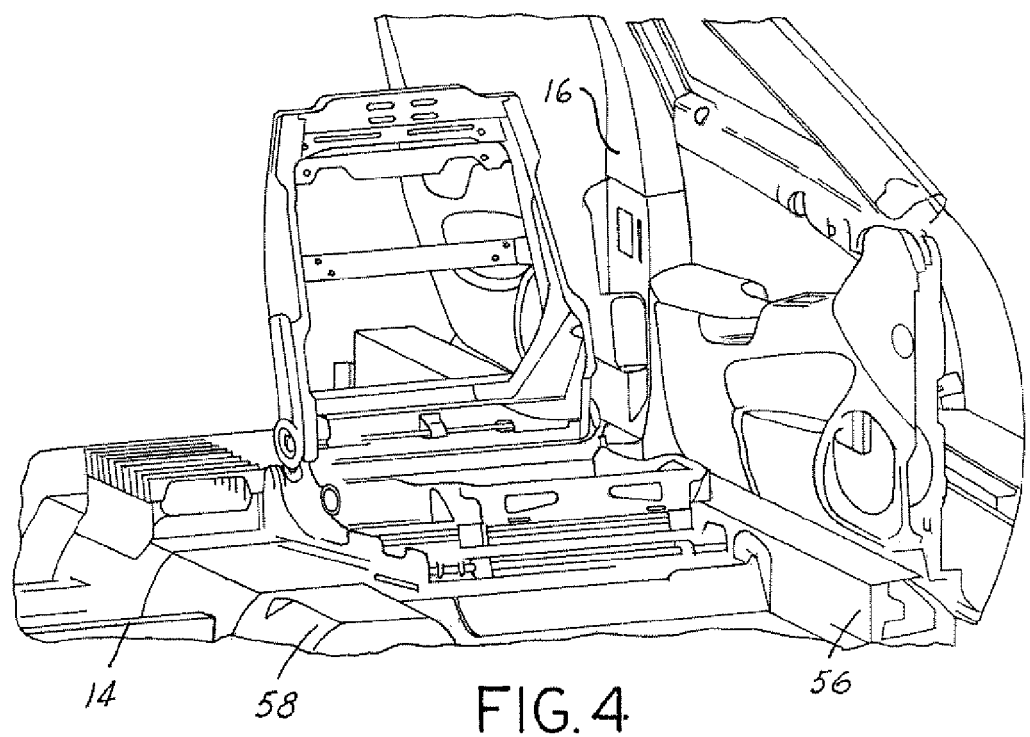
FIG. 4 is an illustration of the automotive seat assembly illustrated in FIG. 1, the seat illustrated mounted within an automobile prior to side-impact.

The rear lateral support assembly 24 is mounted on the frame base 20 such that the rocker panel end cap assembly 36 is positioned to engage a vehicle rocker panel 56 during impact. Similarly, the tunnel console end cap assembly 48 is similarly positioned to engage a vehicle tunnel console 58 during impact (see FIGS. 4 and 5). This generates a rigid support between the rocker panel 56 and the tunnel console 58 during side impact that provides additional rigidity and strength to the vehicle. This is accomplished without restricting seat positioning adjustments. In addition, it is contemplated that the support frame 26 may be rotationally mounted to the frame base 20 such that if the frame base 20 is vertically adjusted, the support frame 26 and tubular member 32 may rotate relative to the end cap assembles 36,48 to keep the rear alteral support assembly 24 out of the way of other seating elements while keeping the end cap assemblies 36,48 in position to properly engage the rocker panel 56 and tunnel console 58 during side impact.

Figure 1:
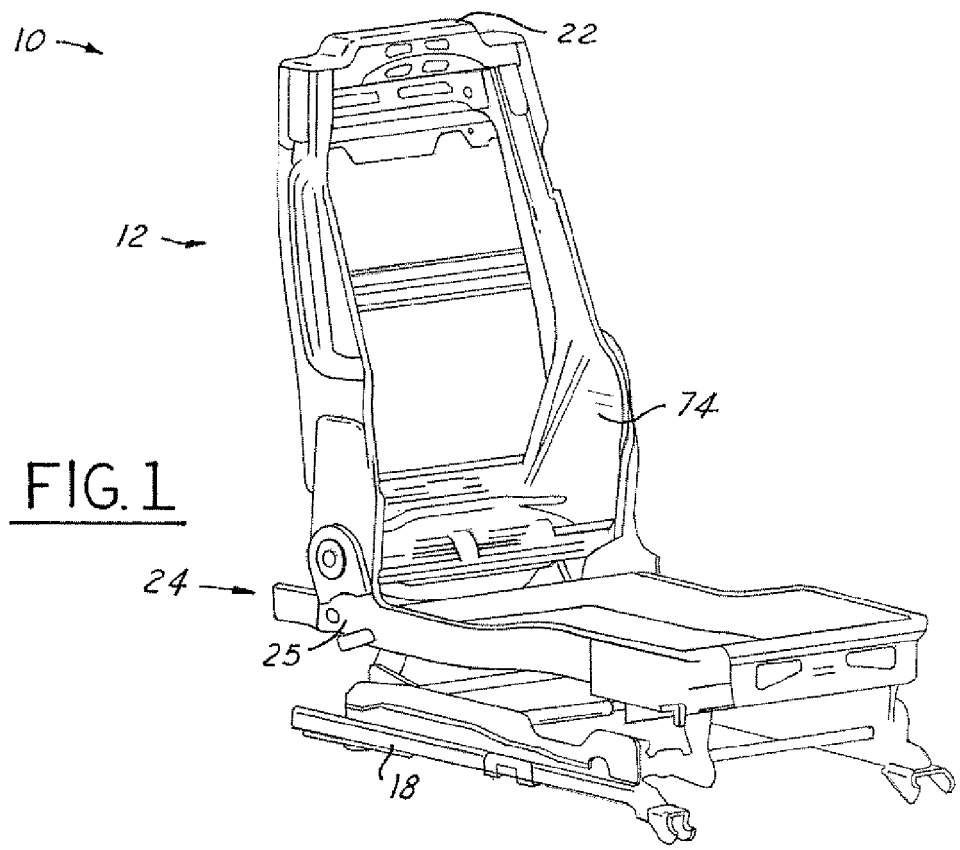
FIG. 1 is an illustration of an automotive seat assembly in accordance with the present invention.
Figure 2:
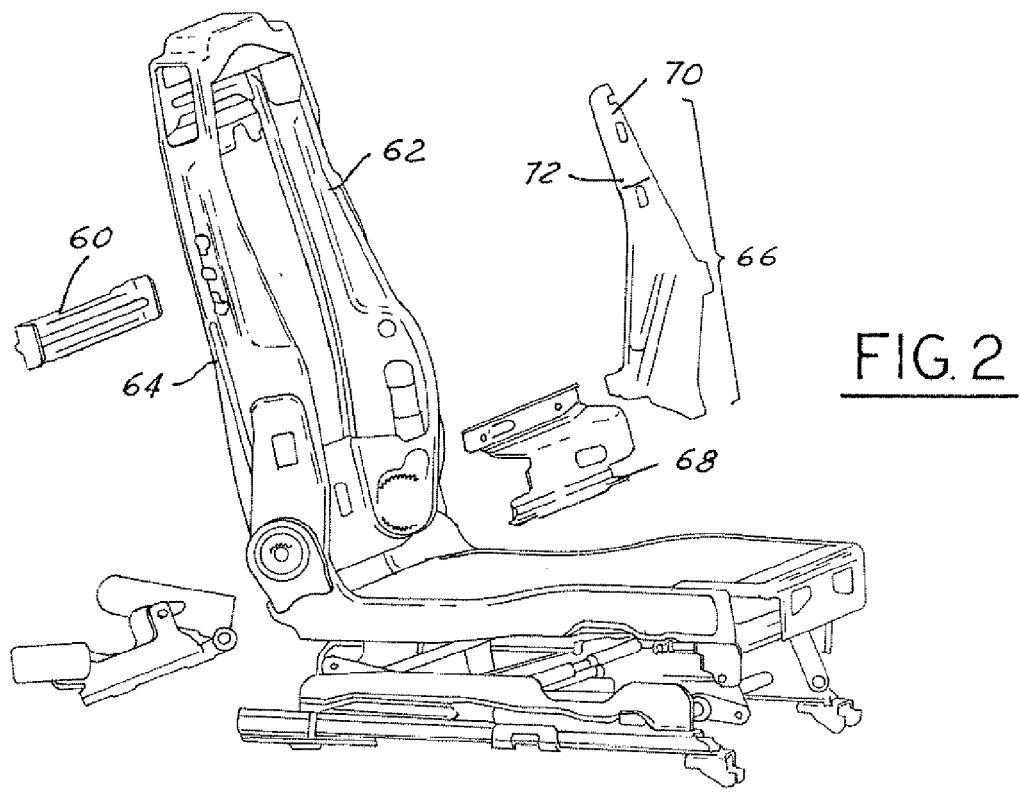
FIG. 2 is an exploded illustration of the automotive seat assembly illustrated in FIG. 1.
Figure 3:
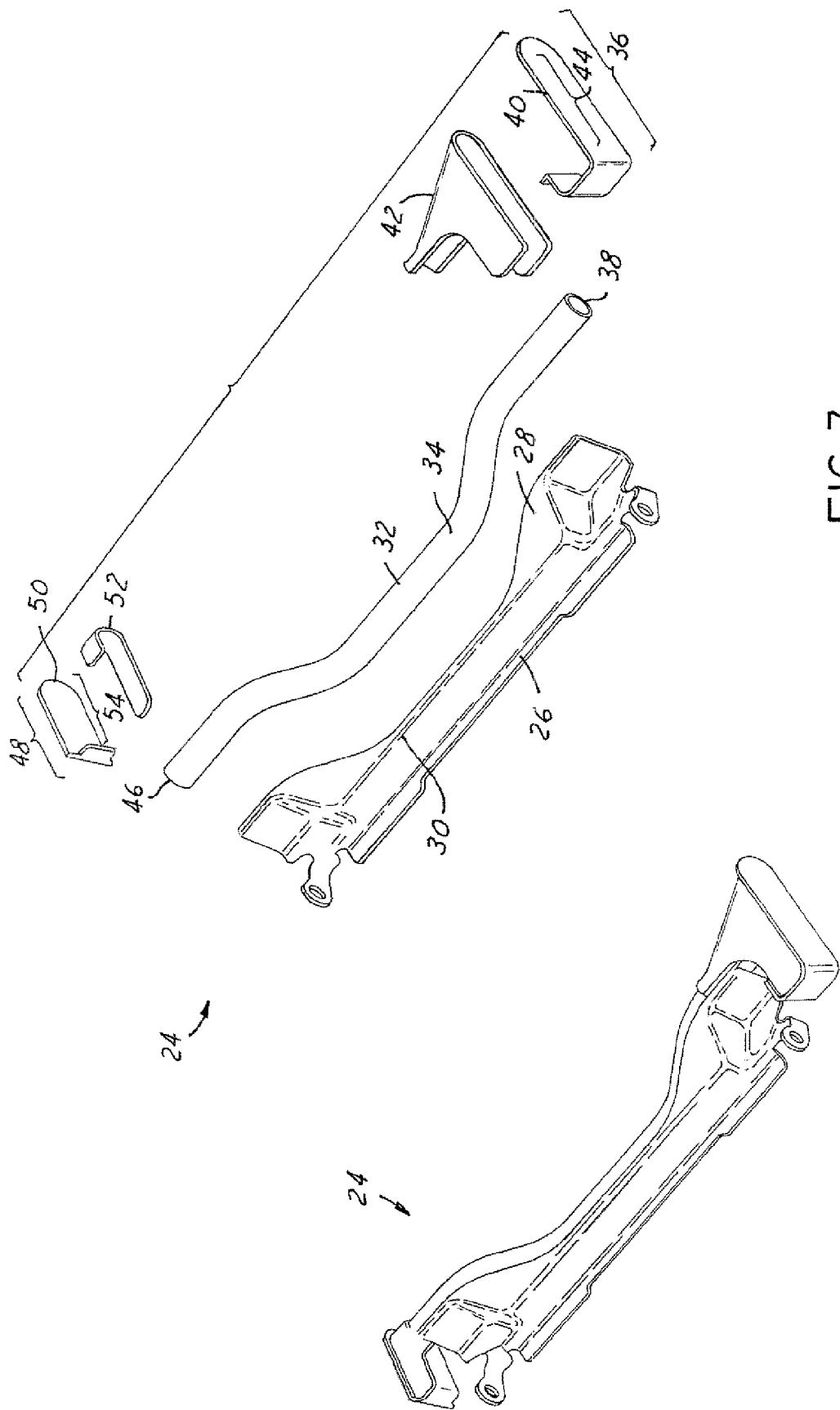
FIG. 3 is a detailed exploded illustration of a rear lateral support assembly for use in the automotive seat assembly illustrated in FIG. 1.

The present invention may further includes an upper section cross brace 60 preferably welded between a frame back rocker side 62 and a frame back tunnel side 64 as shown in FIG. 2. This provides lateral support to the vehicle frame back 22 during collision. A midsection brace 66 may additionally be utilized to further increase seat rigidity. Although a variety of midsection braces 66 may be utilized, one embodiment contemplates the use of a horizontal c-section brace portion 68 mounted, preferably welded, in a lower portion of the frame back 22 between the frame back rocker side 62 and the frame back tunnel side 64. Additionally a vertical brace portion 70 mounted to the frame back rocker side 62 provides additional strength and passenger protection. The vertical brace portion preferably includes a vertical c-section portion 72 in conjunction with a vertical triangular brace portion 74. The vertical triangular brace portion 74 is preferably welded to the horizontal c-section brace portion 68 to generate both lateral and bending resistance to the frame back 22. The vertical brace portion 70 and the horizontal c-section brace portion 68 act in concert to form a horizontal lower brace. This adds more resistance to intrusion during side impact collisions.

While particular embodiments of the invention have been shown and described, numerous variations and alternative embodiments will occur to those skilled in the art. Accordingly, it is intended that the invention be limited only in terms of the appended claims.

The invention claimed is:

1. An automotive seat assembly with improved side impact rigidity comprising:
 a seat frame comprising:
 a frame track;
 a frame base slidably engaged to said frame track; and
 a frame back rotatably engaged to said frame base; and
 a rear lateral support assembly comprising:
 a support frame attached to a rear portion of said frame base such that said support frame is movable in concert with said frame base, said support frame defining a pocket portion;
 a tubular member positioned within said pocket portion;
 a rocker panel end cap assembly securing a first end of said tubular member within said pocket portion, said rocker panel end cap positioned to engage a rocker panel; and
 a tunnel console end cap assembly securing a second end of said tubular member within said pocket portion, said tunnel console end cap assembly positioned to engage a tunnel console such that said tubular member generates a rigid support between said rocker panel and said tunnel console.

2. An automotive seat assembly as described in claim 1 wherein said support frame is rotatably attached to said frame base, said frame base vertically adjustable, said support frame and said tubular member rotating relative to said rocker panel end cap assembly and said tunnel console end cap assembly during vertical movement of said frame base.

3. An automotive seat assembly as described in claim 1, wherein:
 said support frame comprises a forward extended pocket portion; and
 said tubular member comprises a forward extended tubular portion contingent with said forward extended pocket portion.

4. An automotive seat assembly as described in claim 1, wherein said rocker panel end cap assembly comprises:
 a rocker end cap element; and
 a c-section triangular brace securing said tubular member to said support frame.

5. An automotive seat assembly as described in claim 1, further comprising:
 a upper-section cross brace welded laterally between a frame back rocker-side and a frame back tunnel-side.

6. An automotive seat assembly as described in claim 1, further comprising:
 a mid-section brace positioned on a lower portion of a frame back rocker-side.

7. An automotive seat assembly as described in claim 6, wherein said mid-section brace comprises:
 a horizontal c-section brace portion mounted on a lower portion of said frame back, said horizontal c-section mounted between said frame back rocker-side and said frame back tunnel-side to generate a horizontal lower brace; and
 a vertical brace portion mounted on said frame back rocker-side, said vertical brace portion including a triangular brace portion mounted to said horizontal c-section brace portion.

8. An automotive seat assembly as described in claim 1, wherein;
 said rocker panel end cap assembly comprises an elongated rocker end cap element; and
 said tunnel console end cap assembly comprises an elongated tunnel end cap element.

9. An automotive seat assembly as described in claim 7, wherein said vertical brace portion comprises a vertical c-section brace portion.

10. An automotive seat assembly as described in claim 1, wherein said support frame is bolted to said frame base.

11. An automotive seat assembly with improved side impact rigidity comprising:
 a seat frame comprising:
 a frame track;
 a frame base slidably engaged to said frame track, said frame base angularly and vertically adjustable relative to said frame track; and
 a frame back rotatably engaged to said frame base; and
 a rear lateral support assembly comprising:
 a support frame attached to a rear portion of said frame base such that said support frame is movable in concert with said frame base, said support frame defining a pocket portion, said support frame rotatably attached to said frame base;

a tubular member positioned within said pocket portion;

a rocker panel end cap assembly securing a first end of said tubular member within said pocket portion, said rocker panel end cap positioned to engage a rocker panel; and a tunnel console end cap assembly securing a second end of said tubular member within said pocket portion, said tunnel console end cap assembly positioned to engage a tunnel console such that said tubular member generates a rigid support between said rocker panel and said tunnel console;

wherein said support frame and said tubular member rotate relative to said rocker panel end cap assembly and said tunnel console end cap assembly during movement of said frame base.

12. An automotive seat assembly as described in claim 11, wherein:

said support frame comprises a forward extended pocket portion; and said tubular member comprises a forward extended tubular portion contingent with said forward extended pocket portion.

13. An automotive seat assembly as described in claim 11, wherein said rocker panel end cap assembly comprises:

a rocker end cap element; and a c-section triangular brace securing said tubular member to said support frame.

14. An automotive seat assembly as described in claim 10, further comprising:

a upper-section cross brace welded laterally between a frame back rocker-side and a frame back tunnel-side.

15. An automotive seat assembly as described in claim 10, further comprising:

a mid-section brace positioned on a lower portion of a frame back rocker-side.

16. An automotive seat assembly as described in claim 15, wherein said mid-section brace comprises:

a horizontal c-section brace portion mounted on a lower portion of said frame back, said horizontal c-section mounted between said frame back rocker-side and said frame back tunnel-side to generate a horizontal lower brace; and a vertical brace portion mounted on said frame back rocker-side, said vertical brace portion including a triangular brace portion mounted to said horizontal c-section brace portion.

17. An automotive seat assembly as described in claim 16, wherein said vertical brace portion comprises a vertical c-section brace portion.

18. A method of preventing side-impact protrusion on an automotive seat assembly comprising:

bolting a rear lateral support assembly onto a rear portion of a frame base of a seat frame, said rear lateral support assembly comprising:

a support frame attached to said rear portion of said frame base such that said support frame is movable in concert with said frame base, said support frame defining a pocket portion, said support frame rotatably attached to said frame base;

a tubular member positioned within said pocket portion;

a rocker panel end cap assembly securing a first end of said tubular member within said pocket portion; and a tunnel console end cap assembly securing a second end of said tubular member within said pocket portion, said tunnel console end cap assembly positioned to engage a tunnel console such that said tubular member generates a rigid support between said rocker panel and said tunnel console;

positioning said rocker panel end cap to engage a rocker panel during side impact;

positioning said tunnel console end cap to engage tunnel console during side impact.

19. A method as described in claim 18, further comprising:

rotating said support frame and said tubular member relative to said rocker panel end cap assembly and said tunnel console end cap assembly during positional adjustment of said frame base.

* * * * *